United States Patent
Storey

(10) Patent No.: US 6,381,340 B1
(45) Date of Patent: Apr. 30, 2002

(54) METHOD FOR CALCULATING RELATIVE PHASES BETWEEN SIGNAL CHANNELS IN A MULTI-SENSOR TRACKING DEVICE

(75) Inventor: John J. Storey, Wollaton (GB)

(73) Assignee: DigiLens, Inc., Sunnyvale, CA (US)

( * ) Notice: Subject to any disclaimer, the term of this patent is extended or adjusted under 35 U.S.C. 154(b) by 0 days.

(21) Appl. No.: 09/328,718

(22) Filed: Jun. 9, 1999

Related U.S. Application Data

(60) Provisional application No. 60/090,746, filed on Jun. 26, 1998.

(51) Int. Cl.$^7$ .................................................. G06K 9/00
(52) U.S. Cl. ........................................ 382/100; 348/169
(58) Field of Search ................................ 382/312, 103, 382/100; 348/47, 48, 153, 154, 169; 700/90

(56) References Cited

U.S. PATENT DOCUMENTS

| | | | | |
|---|---|---|---|---|
| 4,675,820 A | | 6/1987 | Smith et al. ................. | 364/453 |
| 5,307,289 A | * | 4/1994 | Harris ......................... | 364/516 |
| 5,414,643 A | * | 5/1995 | Blackman et al. .......... | 364/516 |
| 5,421,187 A | | 6/1995 | Morgan ....................... | 73/1 D |
| 5,537,118 A | * | 7/1996 | Appriou ...................... | 342/95 |
| 6,176,837 B1 | * | 1/2001 | Foxlin ......................... | 600/595 |

OTHER PUBLICATIONS

Patent Abstracts of Japan, Publication No. 59069808, Apr. 20, 1984.
Foxlin, "Intertial Head–Tracker Sensor Fusion by a Complementary Separate–Bias Kalman Filter," Proceedings of VRAIS, Mar. 1996, pp. 185–194.

International Search Report, Application No. PCT/US99/14477, mailed Oct. 19, 1999.

* cited by examiner

*Primary Examiner*—Yon J. Couso
(74) *Attorney, Agent, or Firm*—Skjerven Morrill MacPherson LLP

(57) ABSTRACT

Disclosed is a method for calculating relative phase between channels of a multi-sensor tracking device. The relative phases may be used to calibrate the multi-tracking sensor device to perform more accurately. The method involves recording a plurality of first signals generated by a first channel of the multi-sensor tracking device. The plurality of first signals are generated during a movement of the multi-sensor tracking device. Typically, the multi-sensor tracking device includes several channels, each one of which includes at least one sensor for sensing movement with respect to a corresponding axis. Concurrent to recording of plurality of first signals, a plurality of second signals generated by a second channel of the multi-sensor tracking device, is recorded. The plurality of second signals are generated during the movement of the multi-sensor tracking device. Thereafter, a relative phase between the first and second channels is calculated as a function of the recorded plurality of first signals and the recorded plurality of second signals.

27 Claims, 6 Drawing Sheets

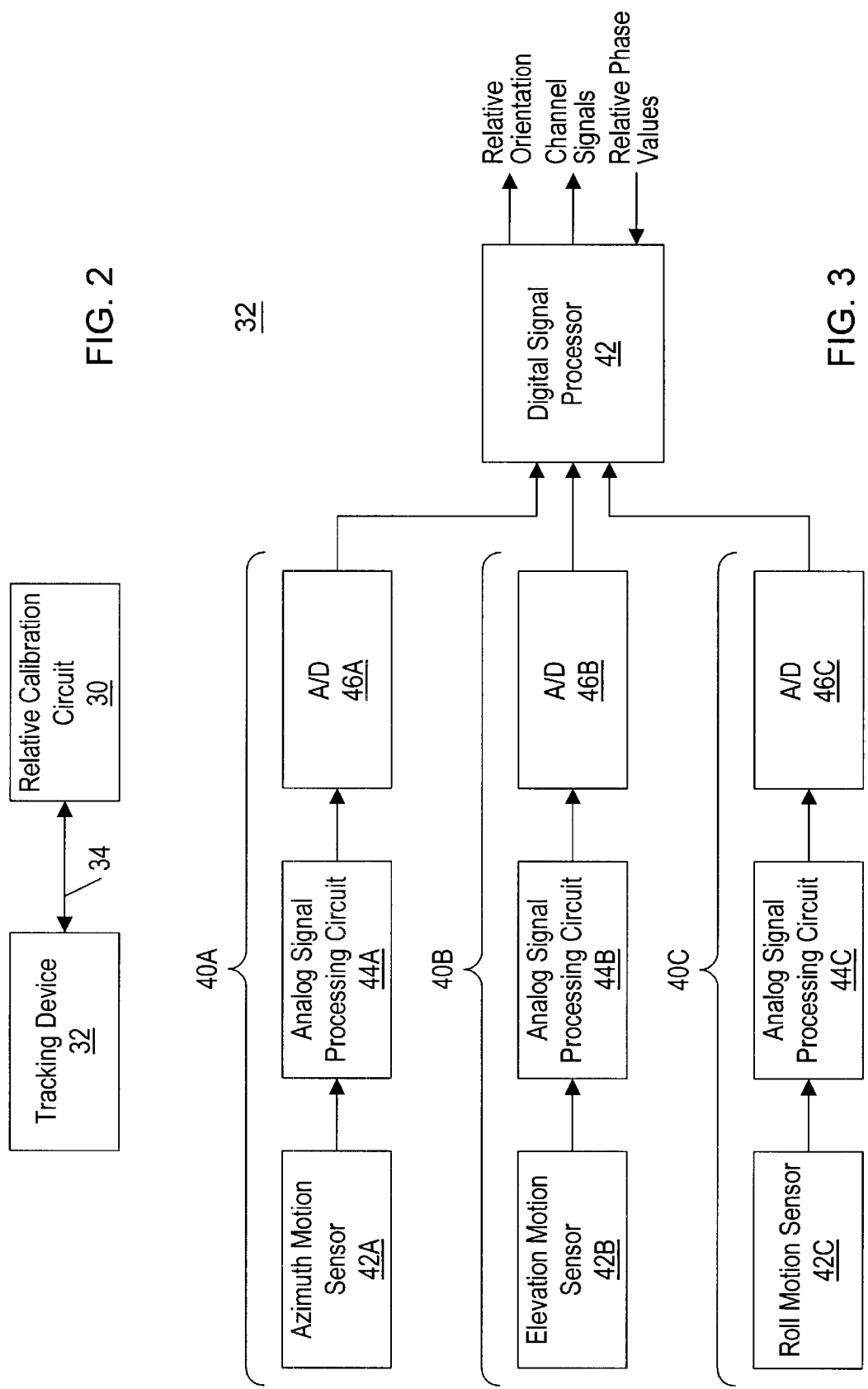

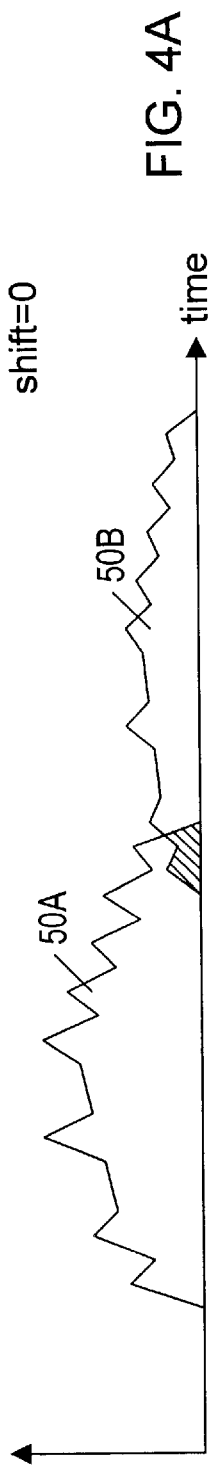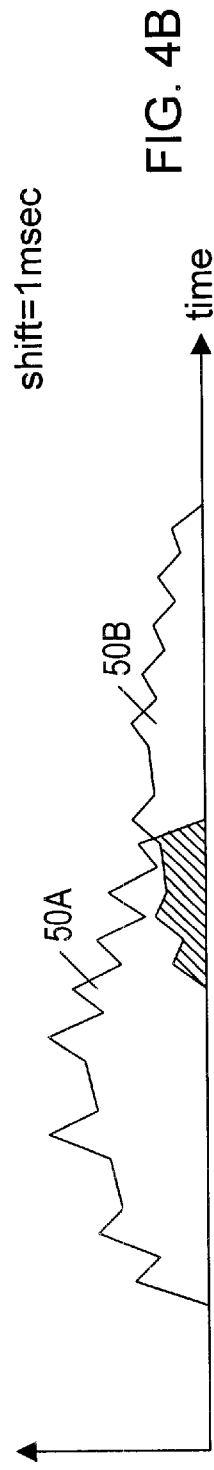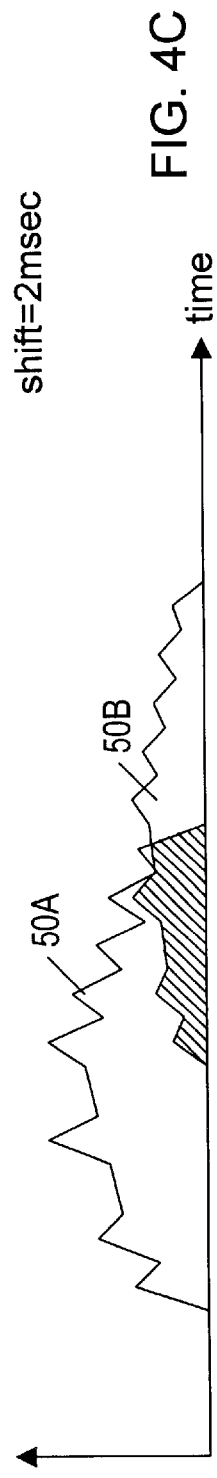

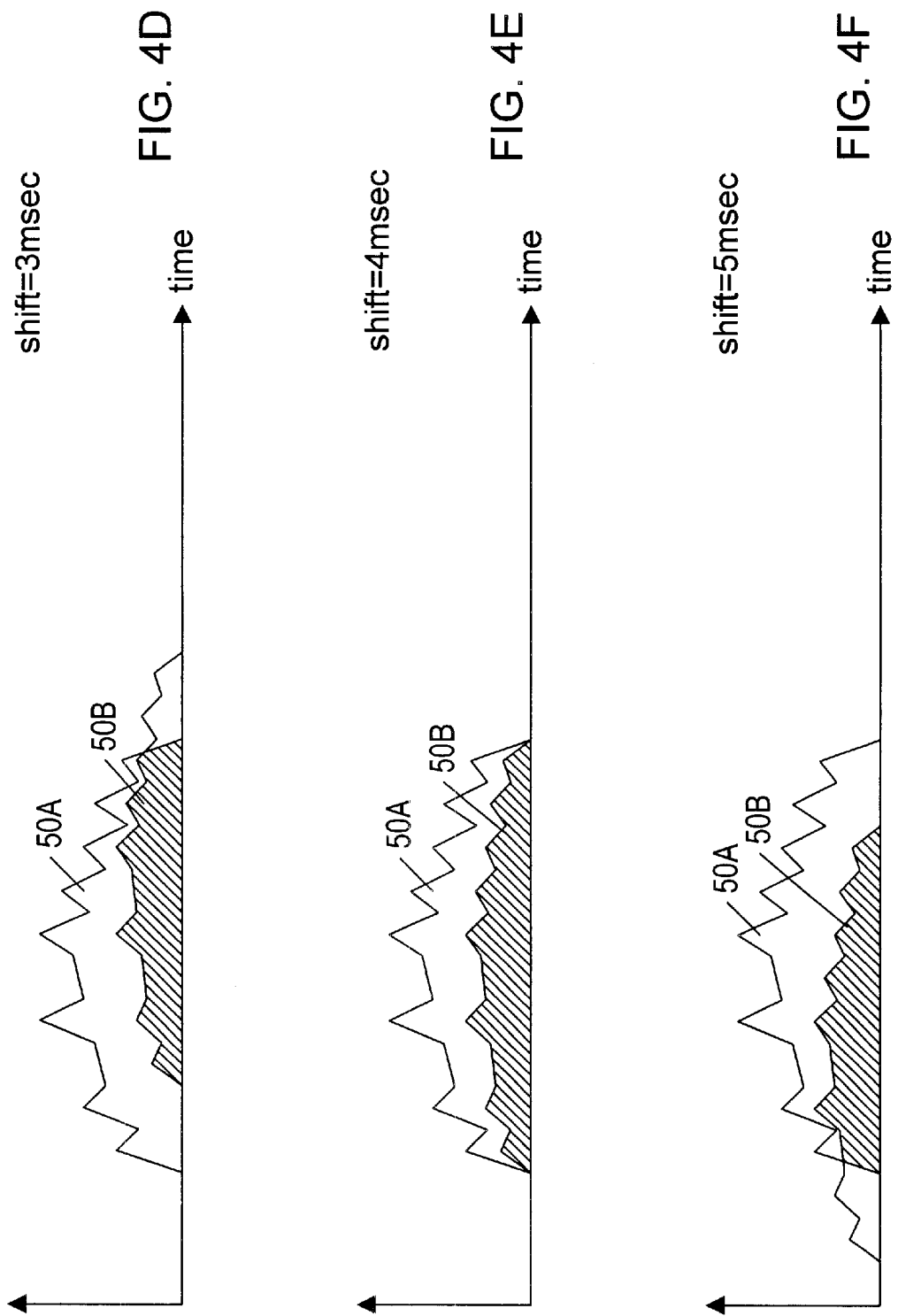

METHOD FOR CALCULATING RELATIVE PHASES BETWEEN SIGNAL CHANNELS IN A MULTI-SENSOR TRACKING DEVICE

RELATED APPLICATIONS

This application claims priority to provisional application entitled METHOD OF PHASE ALIGNMENT OF A MULTI-SENSOR ANGULAR TRACKING DEVICE, Ser. No. 60/090,746, filed Jun. 26, 1998.

BACKGROUND OF THE INVENTION

1. Field of the Invention

The present invention relates to the field of multi-sensor tracking devices, and more particularly to a method of calculating relative phases between channels of a multi-sensor tracking device.

2. Description of the Relevant Art

Multi-sensor tracking devices are well known in the art and are used to orient moving components of a system employing the device with respect to a known position. Multi-sensor tracking devices have application in, for example, virtual reality systems. More particularly, tracking devices may be employed in a headset of a virtual reality system to generate orientation signals relating an instant position of the tracking device, and thus the headset, relative to a predetermined point in space.

FIG. 1 is a block diagram of a typical multi-sensor tracking device 12 used to track angular motion. Tracking device 12 shown in FIG. 1 includes three signal channels 14A–14C, respectively, coupled to a digital signal processor 16. Channels 14A–14C include motion sensors 20A–20C, respectively, analog signal processing circuits 22A–22C, respectively, and analog to digital converters 24A–24C, respectively.

Although not shown in FIG. 1, each sensor 20A–20C is physically mounted within tracking device 12 such that a sensitive axis thereof substantially aligns with one of the orthogonal axes of the tracking device 12. More particularly, sensitive axis of sensor 20A is substantially aligned with the azimuth axis, sensitive axis of sensor 20B is substantially aligned with the elevation axis, and sensitive axis of sensor 20C is substantially aligned with the roll axis.

In theory, each sensor is sensitive to motion with respect to a single axis of the tracking device 12, but insensitive to motion with respect to the remaining axes. Thus, if tracking device 12 shown in FIG. 1 is subjected to simultaneous movement with respect to all three of its orthogonal axes, each motion sensor simultaneously generates an analog signal the magnitude of which is linear to the component of movement with respect to its corresponding axis. These signals may be proportional to the angular position, angular velocity, or angular acceleration about the given axis Analog signals generated by motion sensors 20A–20C are provided as inputs to analog signal processing circuits 22A–22C, respectively. Analog signal processing circuits 22A–22C provide one or more functions. In particular, analog signal processing circuits 22A–22C may operate to amplify the sensor analog signal inputted thereto. Additionally, analog signal processing circuits 22A–22C may operate to filter random pattern or fixed pattern noise components of the analog sensor signal inputted thereto. The processed analog signals are then provided to analog to digital converters 24A–24C for conversion. Digital signal processor 16 coordinates function of the analog to digital converters 24A–24C. More particularly, digital signal processor 16 generates a sample signal which is simultaneously received by each of the analog to digital circuits 24A–24C. In response thereto, internal sample and hold circuits within the analog to digital converter circuits 24A–24C, sample and hold the analog signals outputted by analog signal processing circuits 22A–22C. The held sampled analog signals are subsequently transformed into digital format by analog to digital converters 24A–24C and forwarded to digital signal processor 16. At this point the relative phases of the three channels are locked, and remain precisely defined throughout the processing within the digital signal processor.

Digital signal processor 16 operates in accordance with well known algorithms to generate an orientation signal as a function of the three digital signals outputted by the channels 14A–14C in general, and the analog to digital converters 24A–24C in particular. For example, digital signal processor may accumulate digital channel signals representing angular velocity in order to generate orientation signals relating current position of the tracking device 12 to a known start point.

It is important to note that the algorithms employed within digital signal processor 16 may operate to combine data from the three separate channels with the presumption that the channel signals are synchronous. However, this is not always the case. Manufacturing tolerances dictate that corresponding elements within the channels 14A–14C are less than physically identical. These physical differences between components may cause relative signal delay between channels. Additionally, differences between analog signal processing circuits 22A and 22B may cause a greater signal transmission time through signal processing circuit 22A when compared to signal processing time through circuit 22B. Thus, analog signal processing circuits 22A and 22B may generate analog signal outputs at different times (i.e., out of sync.) not withstanding sensor signal inputs provided at the same instant of time. The overall relative time delay, also referred to as relative phase, between signals outputted by channels 14A–14C, may impair accuracy of the subsequently generated orientation signals.

SUMMARY OF THE INVENTION

The present invention relates to a method for calculating relative phases between channels of a multi-sensor tracking device. The calculated phases can be subsequently used by an internal digital signal processor to generate a more accurate orientation signal. The multi-sensor tracking device comprises a plurality of channels each one of which includes at least one sensor for sensing movement with respect to a corresponding axis. To calculate at least one relative phase between channels, the tracking device is subjected to a known movement constrained with respect to one of the orthogonal axes thereof. As the tracking device moves, a plurality of first signals generated by a first channel is recorded. Concurrently, a plurality of second signals generated by a second channel are likewise recorded. Thereafter, a relative phase between the first and second channels is calculated as a function of the recorded plurality of first signals and recorded plurality of second signals. It is this relative phase which may be used to compensate for relative time lags between signals propagating through the first and second channels in subsequent real time application of the tracking device.

BRIEF DESCRIPTION OF THE DRAWINGS

Other objects and advantages of the invention will become apparent upon reading the following detailed description and upon reference to the accompanying drawings in which:

FIG. 2 is a block diagram of a system for calculating relative phases of a multi-sensor tracking device in accordance with the present invention;

FIG. 3 is a block diagram of a multi-sensor tracking device used in connection with generating relative phases in accordance with the present invention;

FIGS. 4A–4F illustrate aspects of an autocorrelation function implemented by the relative phase calibration circuit of FIG. 2;

Figure 1:
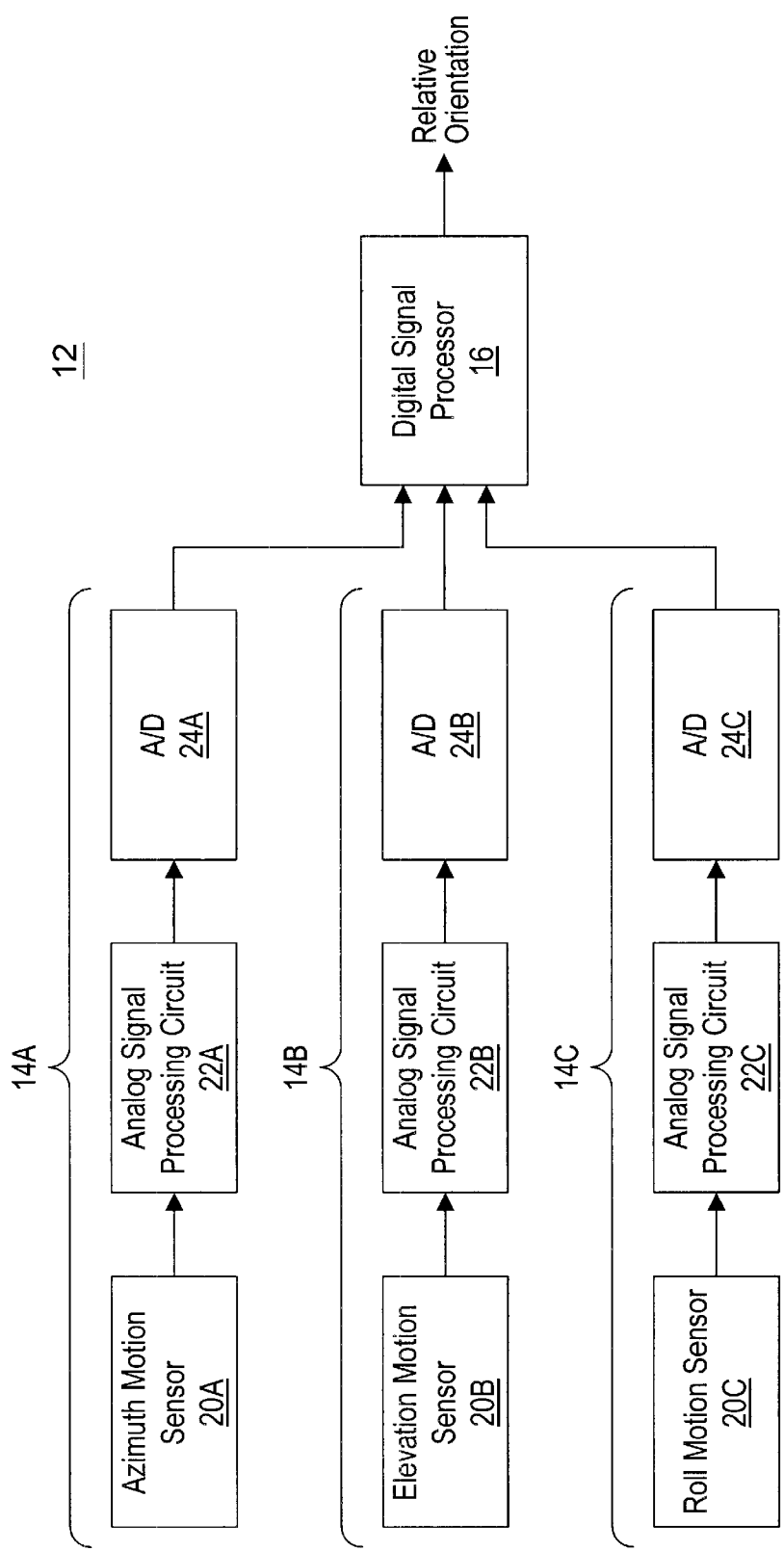
FIG. 1 is a block diagram of a typical prior art multi-sensor tracking device.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 2 shows a schematic diagram of a system for calibrating a multi-sensor tracking device. More particularly, FIG. 2 shows a relative phase calibration circuit 30 coupled to a multi-sensor tracking device 32 via a data link 34.

Tracking device 32 defines a multiple degrees of freedom orientation tracking device used to sense motion with respect to multiple orthogonal axes and generate orientation signals relating current position of the tracking device to a known start point. Tracking device 32 generates orientation signals by analyzing, comparing or combining internally generated signals relating to tracking device movement. In one embodiment, tracking device 32 may sense angular motion with respect to the three orthogonal axes of azimuth, elevation, and roll, and generate internal signals corresponding thereto. In this embodiment, the tracking device contains an embedded digital signal processor which can calculate the tracking device's current orientation relative to a known start point by accumulating angular velocity of the device with respect to three axes.

Relative phase calibration circuit 30 may take the form of a processor based system configured to execute software or firmware. Alternatively it could take form of a different mode of operation of the same digital signal processing system used in normal operation. As will be more fully described below, phase calibration circuit 30 generally calculates relative phases or signal delays between signals transmitted through channels contained within multi-sensor tracking device 32. The calculated relative phases are then used to calibrate tracking device 32. Calibrated in this way, tracking device 32 can compensate fixed, relative system signal transmission delays and thus generate more accurate orientation signals.

FIG. 3 is a block diagram of one embodiment of the tracking device 32 shown in FIG. 2. Tracking device 32 shown in FIG. 3 is configured to sense motion of the device with respect to the azimuth, elevation, and roll axes, and to calculate the device's orientation relative to a known start point using the sensed motion. The orientation may be calculated, for example, by accumulating angular velocity in the three axes. It is noted, however, that the present invention is not to be limited to application to the multi-sensor tracking device shown in FIG. 3.

Multi-sensor tracking device 32 shown in FIG. 3 includes three channels 40A–40C coupled to digital signal processor 41. Each of the channels 40A–40C is configured to generate a channel signal which is linear in magnitude to a an orthogonal component of motion of tracking device 32. These channel signals are subsequently used by digital signal processor 41 to generate orientation signals.

Each of the channels 40A–40C include motion sensors 42A–42C, respectively, analog signal processing circuits 44A–44C, respectively, and analog to digital converters 46A–46C, respectively. Additional components may be included within each of the channels 40A–40C. However, for purposes of explanation, it is noted that each channel 40A–40C contains corresponding components.

Motion sensors 42A–42C may constitute miniature high performance angular sensors which are configured to sense motion along sensitive axes contained therein. Tracking device 32 is shown with a single sensor in each of the three channels 40A–40B. Alternatively, there may be multiple sensors associated with each channel 40A–40B or multiple single sensor channels associated with each orthogonal axis in order to minimize random pattern noise on the internally generated signals by averaging sensor output in multiple sensor channels or channel outputs in single sensor channels aligned to the same axis. Further, multiple single sensor or multiple sensor channels may be provided to enable a wide range of motion types without compromising sensitivity between the motion types. The present invention will be described to tracking device 32 having just three single sensor channels corresponding to three orthogonal axes, respectively.

Although not shown in FIG. 3, each sensor 42A–42C includes a sensitive axis mounted in substantial alignment with one of the three orthogonal axes of tracking device 32. Thus, motion sensor 42A has a sensitive axis substantially in alignment with the azimuth axis of tracking device 32, motion sensor 42B has a sensitive axis in substantial alignment with the elevation axis of tracking device 32, and motion sensor 42C has a sensitive axis in substantial alignment with the roll axis of tracking device 32. If tracking device 32 is subjected to random movement, each sensor, 42A–42C may simultaneously generate an analog sensor signal which is proportional to a component of the movement along the sensor's corresponding axis. These analog signals are provided to analog signal processing circuits 44A–44C, respectively.

Analog signal processing circuits 44A–44C may operate to perform any one of a number of functions. For example, analog signal processing circuits 44A–44C may perform sensor signal amplification, sensor signal random pattern noise removal, or sensor signal fixed pattern noise removal. The output of the analog signal processing circuits 44A–44C, still in analog form, are provided to analog to digital converters 46A–46C respectively. In one embodiment, the analog to digital converters 46A–46C may include internal circuitry (not shown in FIG. 3) for sampling and holding signals outputted by analog signal processing circuits 44A–44C, respectively, in response to a sample signal provided by processor 41. More particularly, the internal sample and hold circuits may be controlled via the sample signal provided by digital signal processor 41 such that each sample and hold circuit within analog to digital converters 46A–46A, samples and holds analog signals provided by analog signal processing circuits 44A–44C at substantially the same instant in time, or at a known, fixed time delay relative to the other channels, for example multiplexing the input to a single analog to digital converter subsystem. The sampled analog signals are ultimately converted into digital format, the results of which are provided to digital signal processor 41 where they are combined under control of the processors software to generate the orientation signals.

Like the prior art tracking device shown in FIG. 1, tracking device 32 shown in FIG. 3 suffers from cross-channel signal lag due to manufacturing tolerances between corresponding components. The relative phases impacts the ability of the tracking device to generate accurate orientation signals. The relative signal delays between channels (or relative phases), however, can be calculated and the tracking device calibrated accordingly as will be described below. Given that the relative phases will not generally change with time, the relative phases can be calculated once and stored within digital signal processor 41 at the factory where the tracking device 32 is calibrated so that subsequent use of tracking device will result in more accurate orientation signals.

In one embodiment, the relative phases are calculated by first applying a stimulus to one channel (e.g. channel 40A) of channels 40A–40C of tracking device 32. In other words, tracking device 32 is subjected to motion constrained to one axis (e.g. azimuth) of the three orthogonal axes thereof. It is to be understood, however, that relative phases may be calculated by applying a stimulus simultaneously to two or three of the three channels 40A–40C. The present invention for calculating relative phases exploits cross-axis sensitivities between channels 40A–40C. In essence, cross-axis sensitivity causes unexpected signals to be generated in, for example, cross channels 40B and 40C, when a motion stimulus is applied solely to the principle axis associated with channel 40A. This unexpected or error signal is typically due to the fact that the sensitive axes of the sensors are often not correctly aligned with the geometrical axes of the tracking device, or there is inherent sensitivity within the detector means to stimuli in orthogonal channels. However, this misalignment is fixed and the cross axis sensitivity signals generated are likewise fixed. This results in cross axis error signals on the cross channels that are linearly proportional to the stimuli applied to the one channel. Additional sources of cross axis error can be due to cross coupling between electrical signals of separate channels. Again, this effect is typically linear. Alternatively, movement in a plane substantially out of the planes of sensitivity of the three orthogonal axes will also give rise to sets of linearly proportional signals which can be used for phase alignment. However the on-axis method described has the advantage that it is based upon the sort of calibrated motion about single axes normally required for accurate channel calibration. If signal to noise ratio of cross axis signals is poor, the out of plane measurements could be used in addition to the on-axis method described.

As tracking device 32 is moved solely with respect to the azimuth axis thereof, motion sensor 42A generates a series of analog signals. Additionally, a series of corresponding analog signals are generated by motion sensors 42B and 42C due to cross axis sensitivity. The analog motion signals generated by sensors 42A–42C are subsequently processed by analog signal processing circuits 44A–44C, respectively.

Analog to digital converter circuits 46A–46C sample and hold outputs of analog signal processing circuit 44A–44C in response to a sample command generated by digital signal processor 41. The sampled signals are converted into digital format and stored within a buffer memory (not shown in FIG. 3) of digital signal processor 41 or transmitted directly to relative phase calibration circuit 30 (see FIG. 2) via data link 34 for storage therein.

Accordingly, a sequence of digital channel signals $C_A$–$C_C$, generated in response to movement of the tracking device 32, are recorded for eventual processing by relative phase calibration circuit 30.

Relative phase calibration circuit 30 executes software that applies an autocorrelation function to the recorded sets of channel signals $C_A$–$C_C$ in order to calculate relative phases between channels of tracking device 32. For example, relative phase calibration circuit 30 applies its autocorrelation function to recorded channel signals $C_A$ and $C_B$ generated by channels 40A and 40B, respectively, to calculate a relative phase $\Phi_{AB}$ between channels 40A and 40B. Relative phase calibration circuit 30 may also apply its autocorrelation function to the recorded channel signals $C_C$–$C_B$ to calculate a relative phase $\Phi_{CB}$ between channels 40B and 40C and to channel signals $C_A$ and $C_B$ to calculate a relative phase $C_{AC}$ between channels 40A and 40C.

The calculated relative phases $\Phi_{AB}$, $\Phi_{BC}$, and $\Phi_{AC}$ may be transmitted back to tracking device 32 for storage within digital signal processor 41 via data link 34, and subsequently employed to compensate for relative lag in signals transmitted through channels 40A–40C during real time use of tracking device 32. However, more accurate relative phases $\Phi_{AB}$, $\Phi_{BC}$, and $\Phi_{AC}$ can be provided to tracking device 32 by averaging results of the autocorrelation function as it is applied to channel signals recorded during subsequent movements of tracking device 32. More particularly, a set of second channel signals $C_A$–$C_C$ may be recorded as tracking device 32 is subjected to movement constrained to the elevation axis, and a third set of channel signals $C_A$–$C_C$ may be recorded during movement of tracking device 32 constrained to the roll axis. The autocorrelation function is applied to the second set of channel signals to generate a second set of relative phases and to the third set of channel signals to generate a third set of relative phases. The three sets relative phases can then be averaged to generate average relative phases. The average relative phases are subsequently transferred to transferred to tracking device 32 for storage therein where they may be used for real time processing.

As noted above, the autocorrelation function of relative phase calibration circuit 30 calculates a relative phase between channels using channel signals recorded during constrained movement of tracking device 32 with respect to a single axis. FIGS. 4A–4F illustrates visually how the autocorrelation function calculates relative phases. FIG. 4A shows wave forms 50A and 50B which represent channel signals $C_A$ and $C_B$, respectively, recorded as tracking device 32 is subjected to movement constrained to the azimuth axis. As one might expect, the signals represented by waveform 50B are generated due to cause axis sensitivity. Waveforms 50A and 50B have substantially the same shape but are offset in time due to relative phase. FIGS. 4B–4F represent the same waveforms 50A and 50B, but with wave form 50B shifted earlier in time by one time unit (e.g., one millisecond). Thus, FIG. 4B represents FIG. 4A with wave form 50B shifted left by one millisecond, and FIGS. 4C represents FIG. 4B with wave form 50B again shifted left by one millisecond. The autocorrelation function, in one embodiment, integrates a common area between each normalized waveform 50A and 50B in FIGS. 4B–4F. The intergrations are subsequently compared to identify the largest thereof. The largest integration, or an extrapolated version thereof, corresponds to the relative phase. For example, FIG. 4E shows a common area larger than the common areas in FIGS. 4A–4D and FIG. 4F. FIG. 4E represents wave form 50B of FIG. 4A shifted left in time by four milliseconds. Thus, with respect to the example shown in FIGS. 4A and 4F, the relative phase between channels 40A and 40B calculated by the autocorrelation function would be close to four milliseconds.

Figure 5:
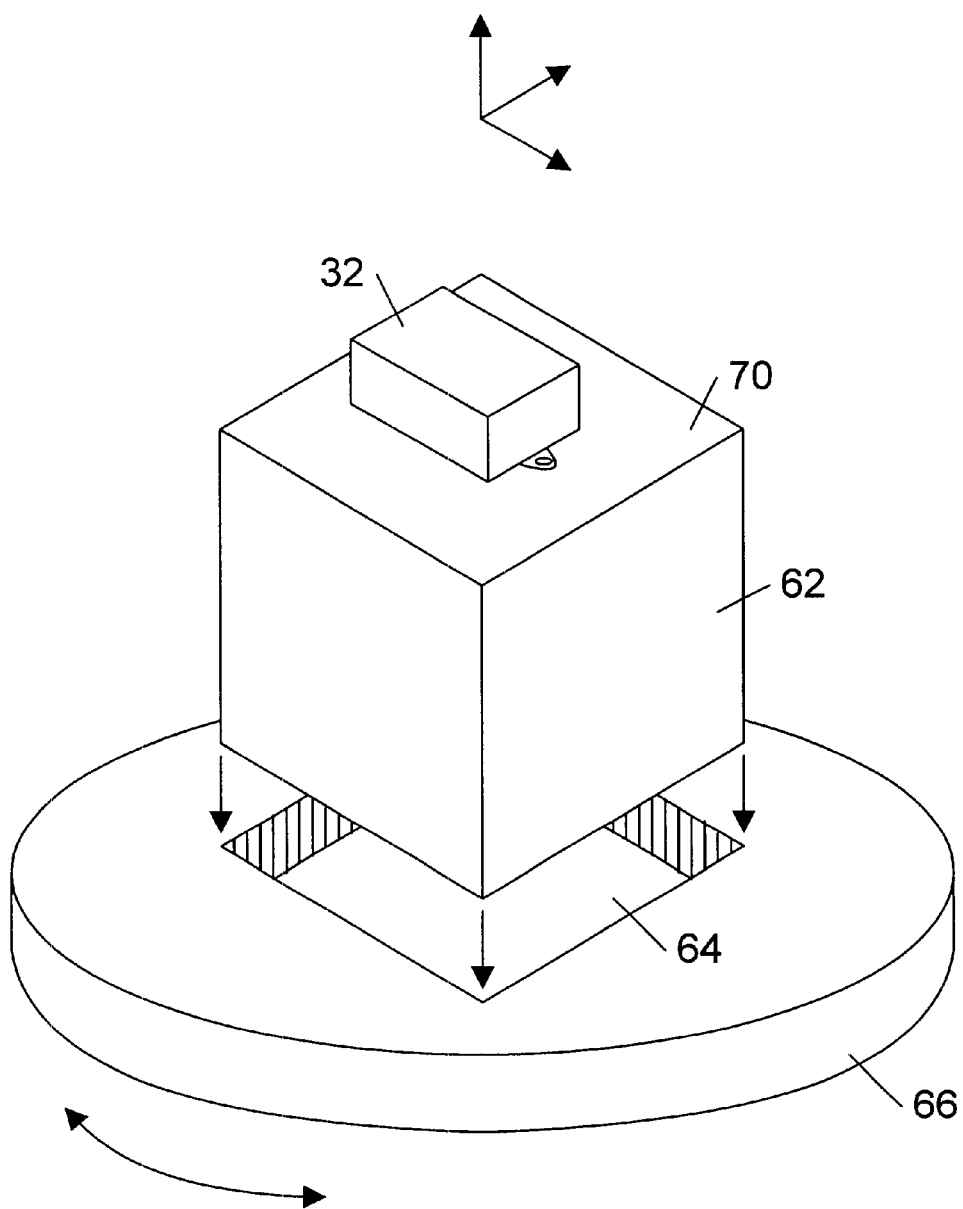
FIG. 5 is a schematic diagram of a device for constraining movement of a tracking device.

FIG. 5 is a schematic diagram of a device 60 used in constraining movement of tracking device 32 with respect to a single axis. The device 60 includes a cube 62 configured to be received within a recess 64 of rotatable plate 66. Cube 60 has at least one face 70 configured to receive tracking device 32, for example, in the middle thereof. The tracking device 32 is mounted to face 70 so that the axes of tracking device 32 align with faces of the cube 62.

With tracking device 32 mounted to cube 62, and with cube 62 received within recess 64, rotatable plate 66 rotates about its axis and constrains movement of tracking device 32 with respect to one axis. FIG. 5 illustrates motion of tracking device 32 constrained to the azimuth axis thereof. As rotatable plate 66 travels through a predefined movement (e.g., 90 degrees), channel signals generated by the individual channels contained within tracking device 32 are recorded within an internal buffer of digital signal processor 16. These recorded channel signals are subsequently downloaded to relative phase calibration circuit for relative phase calculation. It should be noted that the frequency at which channel signals are generated and recorded, should be sufficiently high to allow an accurate calculation of relative phase. The amount of buffer available within digital signal processor 16 for recording the channel signals and the expected relative time delay between channels, may govern the exact sample rate used. For maximum accuracy and minimum buffer space, the recording of channel signals may be triggered by a characteristic stimulus pattern that is known to give strong correlation results (e.g., a pulse stimulus to the primary channel).

The process may repeated three time so that three sets of channel signals may be recorded. With each process, the cube 62 is removed from recess 64, rotated by 90 degrees, and replaced into the recess. Subsequent rotation of rotatable table 66 imparts motion to tracking device 32 that is constrained to a different orthogonal axis. An advantage of this approach is that the relative phase data can be gathered at the same time as the calibration required to determine the gain of each axis.

Figure 6:
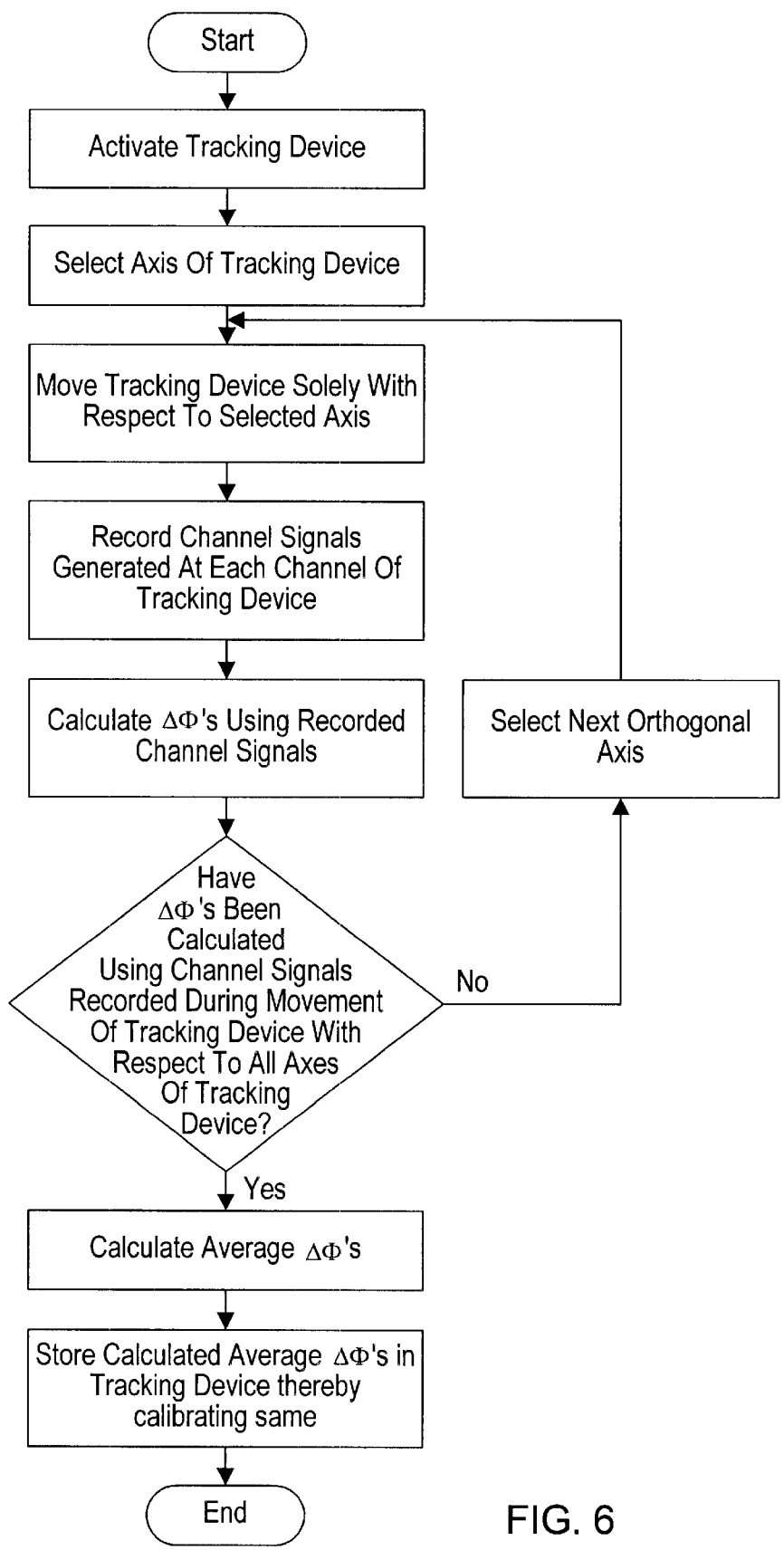
FIG. 6 is a flow chart illustrating operational aspects of the present invention.

FIG. 6 is a flow chart illustrating operational aspects of the present invention to calculate relative phase between channels of the multi-sensor tracking device shown in FIG. 3. At step 104, once the tracking device is activated for operation, an orthogonal axis is selected. Thereafter, the tracking device is moved about the selected axis as shown in step 106. Channel signals $C_A$–$C_C$ generated by channels 40A–40C, respectively as the tracking device is moved, are recorded as shown in step 108. In step 110, the recorded channel signals $C_A$–$C_C$ are provided to the relative phase calculation circuit to calculate relative phases between channels 40A–40C using the autocorelation function described above. As noted above, it may be preferable to calculate average relative phases from several sets of relative phases, each set being calculated using a set of channel signals recorded during movement of the tracking device with respect to a distinct axis. To this preferred end, a decision is made in step 112 as to whether relative phases have been calculated from channel signals generated during movement of the tracking device in all three primary axes thereof. If relative phases have been calculated with respect to movement in all three orthogonal axes, then average relative phases are calculated. In step 114, the average phases are provided to tracking device 32 for subsequent use therein. However, if a set of relative phases corresponding to each orthogonal axis has not been generated, the process returns to step 106.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method comprising:
   recording a plurality of first signals generated by a first channel of a multi-sensor tracking device, wherein the plurality of first signals are generated during a movement of the multi-sensor tracking device, wherein the multi-sensor tracking device comprises a plurality of channels each one of which includes at least one sensor for sensing movement of the at least one sensor with respect to a corresponding axis;
   recording a plurality of second signals generated by a second channel of the multi-sensor tracking device, wherein the plurality of second signals are generated during the movement of the multi-sensor tracking device, and;
   calculating a relative phase between the first and second channels, wherein any relative phase is defined as a relative time lag between corresponding signals traveling through a pair of channels, wherein the relative phase between the first and second channels is calculated as a function of at least one of the recorded plurality of first signals and at least one of the recorded plurality of second signals.

2. The method of claim 1 further comprising:
   recording a plurality of third signals generated by a third channel of the multi-sensor tracking device, wherein the plurality of third signals are generated during the movement of the multi-sensor tracking device;
   calculating a relative phase between the second and third channels, wherein the relative phase between the second and third channels is calculated as a function of at least one of the recorded plurality of second signals and at least one of the recorded plurality of third signals, and;
   calculating a relative phase between the first and third channels, wherein the relative phase between the first and third channels is calculated as a function of at least one of the recorded plurality of first signals and at least one of the recorded plurality of third signals.

3. The method of claim 1 wherein the movement of the multi-sensor tracking device is constrained to a first axis corresponding to the first channel.

4. The method of claim 3 wherein the plurality of second signals are generated by the second channel as a result of cross channel sensitivity between the first and second channels.

5. The method of claim 2 wherein the movement of the multi-sensor tracking device is constrained to a first axis corresponding to the first channel.

6. The method of claim 5 further comprising:

recording a second plurality of first signals generated by the first channel, wherein the second plurality of first signals are generated during a second movement of the multi-sensor tracking, wherein the second movement occurs after the movement, and wherein the second movement is constrained to a second axis corresponding the second channel;

recording a second plurality of second signals generated by the second channel, wherein the second plurality of second signals are generated during the second movement of the multi-sensor tracking;

recording a second plurality of third signals generated by the third channel, wherein the second plurality of third signals are generated during the second movement of the multi-sensor tracking;

calculating a second relative phase between the first and second channels, wherein the second relative phase between the first and second channels is calculated as a function of at least one of the recorded second plurality of first signals and at least one of the recorded second plurality of second signals;

calculating a second relative phase between the second and third channels, wherein the second relative phase between the second and third channels is calculated as a function of at least one of the recorded second plurality of second signals and at least one of the recorded second plurality of third signals;

calculating a second relative phase between the first and third channels, wherein the second relative phase between the first and third channels is calculated as a function of at least one of the recorded second plurality of first signals and at least one of the recorded second plurality of third signals;

recording a third plurality of first signals generated by the first channel, wherein the third plurality of first signals are generated during a third movement of the multi-sensor tracking, wherein the third movement occurs after the second movement, wherein the third movement is constrained to a third axis corresponding to the third channel;

recording a third plurality of second signals generated by the second channel, wherein the third plurality of second signals are generated during the third movement of the multi-sensor tracking;

recording a third plurality of third signals generated by the third channel, wherein the third plurality of third signals are generated during the third movement of the multi-sensor tracking;

calculating a third relative phase between the first and second channels, wherein the third relative phase between the first and second channels is calculated as a function of at least one of the recorded third plurality of first signals and at least one of the recorded third plurality of second signals;

calculating a third relative phase between the second and third channels, wherein the third relative phase between the second and third channels is calculated as a function of at least one of the recorded third plurality of second signals and at least one of the recorded third plurality of third signals;

calculating a third relative phase between the first and third channels, wherein the third relative phase between the first and third channels is calculated as a function of at least one of the recorded third plurality of first signals and at least one of the recorded third plurality of third signals;

generating a combined relative phase between the first and second channels as a function of two or more of the relative phase between the first and second channels, the second relative phase between the first and second channels, and the third relative phase between the first and second channels;

generating a combined relative phase between the second and third channels as a function of two or more of the relative phase between the second and third channels, the second relative phase between the second and third channels, and the third relative phase between the second and third channels, and;

generating a combined relative phase between the first and third channels as a function of two or more of the relative phase between the first and third channels, the second relative phase between the first and third channels, and the third relative phase between the first and third channels.

7. The method of claim 6:

wherein the combined relative phase between the first and second channels is generated by averaging the relative phase between the first and second channels, the first relative phase between the first and second channels, and the second relative phase between the first and second channels;

wherein the combined relative phase between the second and third channels is generated by averaging the relative phase between the second and third channels, the second relative phase between the second and third channels, and the third relative phase between the second and third channels, and;

wherein the combined relative phase between the first and third channels is generated by averaging the relative phase between the first and third channels, the first relative phase between the first and third channels, and the third relative phase between the first and third channels.

8. The method of claim 6 further comprising providing the combined relative phase between the first and second channels, the combined relative phase between the second and third channels, and the combined relative phase between the first and third channels to the multi-sensor tracking device.

9. The method of claim 1 further comprising providing the relative phase between the first and second channels to the multi-sensor tracking device.

10. The method of claim 8 further comprising:

one of the first, second, and third channels generating a signal in response to a subsequent movement of the multi-sensor tracking device, wherein the subsequent movement occurs after the third movement;

a processing circuit of the multi-sensor tracking device receiving the signal generated by one of the first, second, and third channels;

receiving the combined relative phase between the first and second channels, the combined relative phase between the first and third channels, and the combined relative phase between the second and third channels stored in the multi-sensor tracking device, and;

the processing circuit adjusting the received signal generated by one of the first, second, and third channels as a function of at least one of the combined relative phase between the first and second channels, the combined relative phase between the first and third channels, and the combined relative phase between the second and third channels.

11. The method of claim 1 wherein calculating the relative phase between the first and second channels comprises comparing the plurality of first signals and the plurality of second signals to identify a difference in time at which the plurality of first signals substantially correlates to the plurality of second signals.

12. An apparatus comprising:
a processor configured to calculate a relative phase between channels of a multi-sensor tracking device, wherein the relative phase is defined as a relative time lag between corresponding signals traveling through a pair of channels of the multi-sensor tracking device, wherein the multi-sensor tracking device comprises a plurality of channels each one of which includes at least one sensor for sensing movement of the at least one sensor with respect to a corresponding axis;
wherein the processor is configured to receive a plurality of first signals generated by a first channel of the multi-sensor tracking device, wherein the plurality of first signals are generated during a movement of the multi-sensor tracking device;
wherein processor is configured to receive a plurality of second signals generated by a second channel of the multi-sensor tracking device, wherein the plurality of second signals are generated during movement of the multi-sensor tracking device, and;
wherein the processor is configured to generate a relative phase between the first and second channels of the multi-sensor tracking device as a function of at least one of the received plurality of first signals and at least one of the received plurality of second signals.

13. The apparatus of claim 12;
wherein the processor is configured to receive a plurality of third signals generated by a third channel of the multi-sensor tracking device, wherein the plurality of third signals are generated during the movement of the multi-sensor tracking device;
wherein the processor is configured to calculate a relative phase between the second and third channels, wherein the relative phase between the second and third channels is calculated as a function of at least one of the received plurality of second signals and at least one of the received plurality of third signals, and;
wherein the processor is configured to calculate a relative phase between the first and third channels, wherein the relative phase between the first and third channels is calculated as a function of at least one of the received plurality of first signals and at least one of the received plurality of third signals.

14. The apparatus of claim 12 further comprising a device configured to constrain the movement of the tracking device to a first axis corresponding to the first channel.

15. The apparatus of claim 12 wherein the device comprises:
a cube having at least one surface configured to receive the multi-sensor tracking device, and;
a plate having a flat surface and a recess formed in the flat surface, wherein the recess is configured to receive the cube, wherein plate is configured to rotate about an axis transverse to the flat surface.

16. The apparatus of claim 13 further comprising a device configured to constrain the movement of the tracking device to a first axis corresponding to the first channel.

17. The apparatus of claim 16:
wherein the processor is configured to receive a second plurality of first signals generated by the first channel, wherein the second plurality of first signals are generated during a second movement of the multi-sensor tracking, wherein the second movement occurs after the movement, and wherein the second movement is constrained to a second axis corresponding the second channel;
wherein the processor is configured to receive a second plurality of second signals generated by the second channel, wherein the second plurality of second signals are generated during the second movement of the multi-sensor tracking;
wherein the processor is configured to receive a second plurality of third signals generated by the third channel, wherein the second plurality of third signals are generated during the second movement of the multi-sensor tracking;
wherein the processor is configured to calculate a second relative phase between the first and second channels, wherein the second relative phase between the first and second channels is calculated as a function of at least one of the received second plurality of first signals and at least one of the received second plurality of second signals;
wherein the processor is configured to calculate a second relative phase between the second and third channels, wherein the second relative phase between the second and third channels is calculated as a function of at least one of the received second plurality of second signals and at least one of the received second plurality of third signals;
wherein the processor is configured to calculate a second relative phase between the first and third channels, wherein the second relative phase between the first and third channels is calculated as a function of at least one of the received second plurality of first signals and at least one of the received second plurality of third signals;
wherein the processor is configured to receive a third plurality of first signals generated by the first channel, wherein the third plurality of first signals are generated during a third movement of the multi-sensor tracking, wherein the third movement occurs after the second movement, wherein the third movement is constrained to a third axis corresponding to the third channel;
wherein the processor is configured to receive a third plurality of second signals generated by the second channel, wherein the third plurality of second signals are generated during the third movement of the multi-sensor tracking;
wherein the processor is configured to receive a third plurality of third signals generated by the third channel, wherein the third plurality of third signals are generated during the third movement of the multi-sensor tracking;
wherein the processor is configured to calculate a third relative phase between the first and second channels, wherein the third relative phase between the first and second channels is calculated as a function of at least one of the received third plurality of first signals and at least on e of the received third plurality of second signals;
wherein the processor is configured to calculate a third relative phase between the second and third channels, wherein the third relative phase between the second and third channels is calculated as a function of at least one of the received third plurality of second signals and at least one of the received third plurality of third signals;

wherein the processor is configured to calculate a third relative phase between the first and third channels, wherein the third relative phase between the first and third channels is calculated as a function of at least one of the received third plurality of first signals and at least one of the received third plurality of third signals;

wherein the processor is configured to calculate a combined relative phase between the first and second channels as a function of the relative phase between the first and second channels, the second relative phase between the first and second channels, and the third relative phase between the first and second channels;

wherein the processor is configured to calculate an a combined relative phase between the second and third channels as a function of the relative phase between the second and third channels, the second relative phase between the second and third channels, and the third relative phase between the second and third channels, and;

wherein the processor is configured to calculate an a combined relative phase between the first and third channels as a function of the relative phase between the first and third channels, the second relative phase between the first and third channels, and the third relative phase between the first and third channels.

18. The apparatus of claim 17:

wherein the combined relative phase between the first and second channels is generated by averaging the relative phase between the first and second channels, the first relative phase between the first and second channels, and the second relative phase between the first and second channels;

wherein the combined relative phase between the second and third channels is generated by averaging the relative phase between the second and third channels, the second relative phase between the second and third channels, and the third relative phase between the second and third channels, and;

wherein the combined relative phase between the first and third channels is generated by averaging the relative phase between the first and third channels, the first relative phase between the first and third channels, and the third relative phase between the first and third channels.

19. The apparatus of claim 17 wherein the processor is configured to provide the combined relative phase between the first and second channels, the combined relative phase between the second and third channels, and the combined relative phase between the first and third channels to the multi-sensor tracking device.

20. The apparatus of claim 12 wherein the processor is configured to provide the relative phase between the first and second channels to the multi-sensor tracking device for storage therein.

21. The apparatus of claim 12 further comprising a data link coupled to the processor, wherein the data link is configured to transmit the plurality of first and second signals received by the processor.

22. A multi-sensor tracking device comprising:

a plurality of channels each one of which includes at least one sensor for sensing movement of the at least one sensor with respect to a corresponding axis, wherein the plurality of channels are configured to generate one or more signals in response to movement of the tracking device, and;

a processor in data communication with the plurality of channels, wherein the processor is configured to generate orientation signals relating a current orientation of the multi-sensor tracking device to a pre-determined point in space, wherein the processor is configured to generate the orientation signals as a function of one or more signals generated by the plurality of channels and one or more relative phases, wherein each relative phase is defined as a relative time lag between corresponding signals traveling through a pair of the plurality of channels.

23. The multi-sensor tracking device of claim 22 wherein the relative phases are stored therein, wherein the relative phases include a relative phase between a first and a second channel of the plurality of channels, wherein the relative phase between the first and second channels is calculated from a plurality of first signals generated by the first channel during a movement of the multi-sensor tracking device and a plurality of second signals generated by the second channel during the movement of the multi-sensor tracking device.

24. The multi-sensor tracking device of claim 23 wherein the relative phases include a relative phase between the second channel and a third channel and a relative phase between the first and third channels, wherein the relative phase between the second and third channels is calculated from the plurality of second signals and a plurality of third signals generated by the third channel during the movement of the multi-sensor tracking device, and wherein the relative phase between the first and third channels is calculated from the plurality of first signals and the plurality of third signals.

25. A method comprising:

a plurality of channels of a multi-sensor tracking device generating one or more signals in response to movement of the a multi-sensor tracking device, wherein each one of the channels includes at least one sensor for sensing movement of the at least one sensor with respect to a corresponding axis generating orientation signals as a function of the one or more signals generated by the plurality of channels and one or more relative phases, wherein each relative phase is defined as a relative time lag between corresponding signals traveling through a pair of the plurality of channels, wherein each orientation signal relates a current orientation of the multi-sensor tracking device to a pre-determined point in space.

26. The method of claim 25 wherein the relative phases include a relative phase between a first and a second channel of the plurality of channels, wherein the relative phase between the first and second channels is calculated from a plurality of first signals generated by the first channel during a movement of the multi-sensor tracking device and a plurality of second signals generated by the second channel during the movement of the multi-sensor tracking device.

27. The method of claim 26 wherein the relative phases include a relative phase between the second channel and a third channel and a relative phase between the first and third channels, wherein the relative phase between the second and third channels is calculated from the plurality of second signals and a plurality of third signals generated by the third channel during the movement of the multi-sensor tracking device, and wherein the relative phase between the first and third channels is calculated from the plurality of first signals and the plurality of third signals.

* * * * *